United States Patent
Hules et al.

(10) Patent No.: US 7,348,880 B2
(45) Date of Patent: Mar. 25, 2008

(54) OCCUPANT DETECTION AND TEMPERATURE FOREWARN SAFETY SYSTEM AND METHOD

(75) Inventors: Frank J. Hules, Calabasas, CA (US); Brian A. Hoshide, Simi Valley, CA (US)

(73) Assignee: Delphi Technologies, Inc., Troy, MI (US)

( * ) Notice: Subject to any disclaimer, the term of this patent is extended or adjusted under 35 U.S.C. 154(b) by 212 days.

(21) Appl. No.: 11/183,639

(22) Filed: Jul. 18, 2005

(65) Prior Publication Data

US 2007/0013531 A1 Jan. 18, 2007

(51) Int. Cl.
*G08B 19/00* (2006.01)

(52) U.S. Cl. ................ 340/522; 340/573.1; 340/686.1; 340/425.5

(58) Field of Classification Search ................ 340/522
See application file for complete search history.

(56) References Cited

U.S. PATENT DOCUMENTS

| | | | |
|---|---|---|---|
| 5,793,291 A * | 8/1998 | Thornton | 340/573.1 |
| 5,940,007 A * | 8/1999 | Brinkmeyer et al. | 340/825.69 |
| 5,949,340 A | 9/1999 | Rossi | |
| 6,104,293 A * | 8/2000 | Rossi | 340/573.1 |
| 6,393,348 B1 * | 5/2002 | Ziegler et al. | 340/438 |
| 6,489,889 B1 * | 12/2002 | Smith | 340/573.1 |
| 6,642,838 B1 * | 11/2003 | Barnas et al. | 340/573.1 |
| 6,768,420 B2 * | 7/2004 | McCarthy et al. | 340/573.1 |
| 6,847,302 B2 * | 1/2005 | Flanagan et al. | 340/666 |
| 6,922,147 B1 * | 7/2005 | Viksnins et al. | 340/573.1 |
| 6,924,742 B2 * | 8/2005 | Mesina | 340/573.1 |
| 6,940,400 B2 * | 9/2005 | Pelletier | 340/449 |
| 7,012,533 B2 * | 3/2006 | Younse | 340/573.1 |
| 7,036,390 B2 * | 5/2006 | Tsuchihashi et al. | 73/865.9 |
| 7,081,811 B2 * | 7/2006 | Johnston et al. | 340/449 |
| 7,170,401 B1 * | 1/2007 | Cole | 340/457 |
| 2002/0080014 A1 | 6/2002 | McCarthy et al. | |
| 2003/0222775 A1 | 12/2003 | Rackham et al. | |
| 2004/0049325 A1 * | 3/2004 | Flick et al. | 701/2 |
| 2004/0095252 A1 | 5/2004 | Kraljic et al. | |
| 2004/0155783 A1 * | 8/2004 | Al-Sheikh | 340/584 |

OTHER PUBLICATIONS

EP Search Report dated Oct. 5, 2006.

* cited by examiner

*Primary Examiner*—Benjamin C. Lee
*Assistant Examiner*—Eric M. Blount
(74) *Attorney, Agent, or Firm*—Jimmy L. Funke

(57) ABSTRACT

A system and method are provided for alerting of an occupant endangered by being situated in a variable temperature setting. The system can be utilized within a motor vehicle, and occupants include an infant, a child, a person, and an animal or pet. In an aspect, when a security device receives a signal that an occupant sensor detects the presence of an occupant and a temperature sensor detects a predetermined temperature, both within a predetermined time period, then a security response is initiated. A security response can include triggering an audible alarm, flashing a light, lowering a window, unlocking a door, notifying an owner of the security device, and transmitting an emergency signal to an emergency system including telephone 911 and an emergency response company. The occupant sensor and the temperature sensor may be affixed to a key fob such that an antenna transmits to the security device.

6 Claims, 4 Drawing Sheets

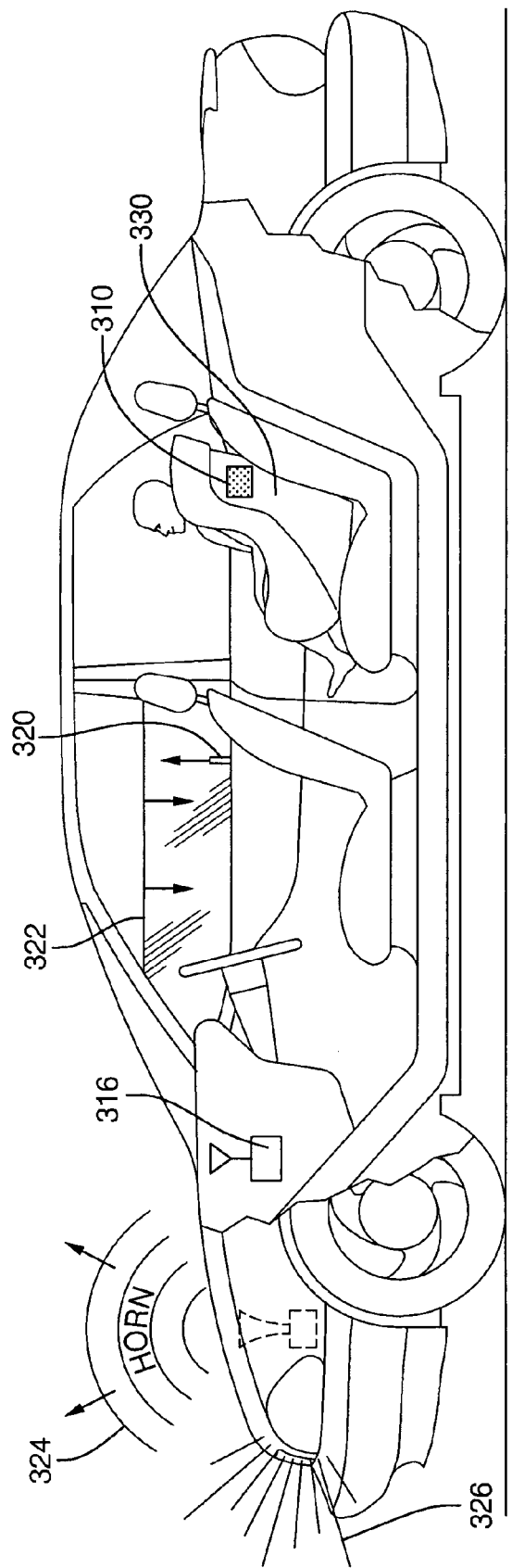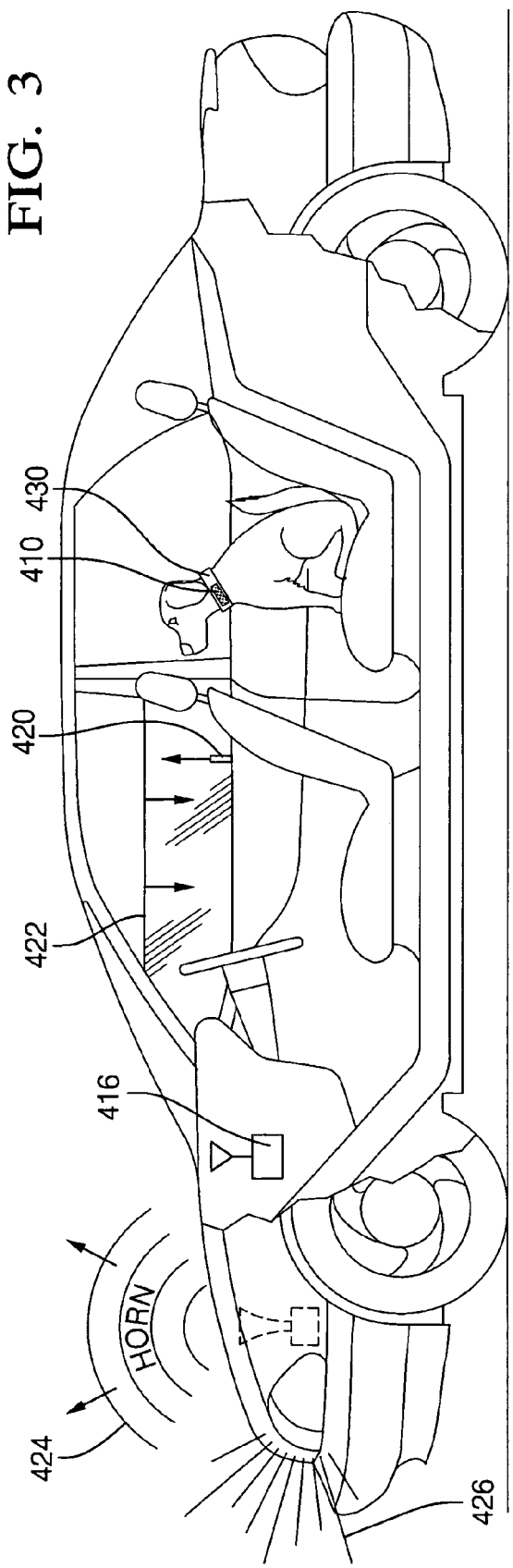

OCCUPANT DETECTION AND TEMPERATURE FOREWARN SAFETY SYSTEM AND METHOD

FIELD OF THE INVENTION

The invention relates generally to occupant detection, and more particularly to detecting and alerting of the presence of an occupant endangered by being situated in a variable temperature setting.

BACKGROUND OF THE INVENTION

The loss of life to infants and children naturally captures national attention. Every year, a considerable and troubling number of infants, children and pets are injured and/or die due to heat related trauma (heat stroke or hyperthermia). Infants, small children and pets are intentionally or unintentionally left, or become trapped by playing, inside the passenger compartment of a family automobile and suffer from heat exposure.

The number of hyperthermia fatalities of children left in motor vehicles in the United States from the year 1998 to 2004 has been reported as 230 fatalities. Also, the number of heat exposure incidents including serious injuries raises this number even higher. A child's body temperature increases three to five times faster than an adult's and children are not able to dissipate heat as efficiently as adults. Heatstroke occurs when the body core temperature reaches 104 degrees F. The results can include permanent organ damage and death. A body core temperature of 107 degrees F. is considered lethal.

Child heatstroke deaths are not limited to hot-weather places and states. Previous research and real-world incidents have demonstrated that on a warm, sunny day, even at temperatures as mild as 60 degrees Fahrenheit, a closed vehicle can rise to dangerous temperatures in just a few minutes and can be lethal. Further, studies have shown that when substituting humid heat for dry heat, injury or death can occur in half the time. The atmosphere and windows of a motor vehicle are relatively transparent to the sun's shortwave radiation and are warmed little. The shortwave energy does however warm objects that it strikes. These objects (e.g., dashboard, steering wheel, childseat) give off longwave radiation, which is efficient at warming the air trapped inside a vehicle. A car's interior can reach 100 degrees within five minutes, and 120 degrees in fifteen minutes, when the outside temperature is only in the high 70s.

Just as with people, heat stroke in pets can cause nausea, loss of consciousness, irreparable brain damage, and death. Pets, more so than humans, are susceptible to overheating. Dogs, for example, are designed to conserve heat. Their sweat glands, which exist on their nose and the pads of their feet, are inadequate for cooling during hot days. Panting and drinking water helps cool them, but if they only have overheated air to breathe, dogs can suffer brain damage and organ damage after just fifteen minutes. Further, if a dog is accustomed to being inside, it is more prone to heatstroke. Brachiocephalic breeds, such as pugs or bulldogs are unable to efficiently regulate their body temperature and are even more susceptible to overheating.

To protect infants and children in motor vehicles, Federal and state authorities have enacted laws (i.e. Federal Motor Vehicle Standard 213). Children under a specified age may not be left unattended in a motor vehicle. Further, all states of the United States and the District of Columbia have enacted child restraint laws. Additionally, all children below a specified age and weight, when riding in a motor vehicle, must ride in an approved child safety seat.

However, even with the enacted laws, in the most recent three-year period of 2002 to 2004, when young children are now placed in rear seats instead of front seats, there has been a ten-fold increase in fatalities from hyperthermia as compared to the rate of the early 1990s. Recently, passenger occupant detection is being utilized for characterizing an occupant and selectively suppressing deployment of a vehicular inflatable restraint. Such a system is described in U.S. Pat. No. 6,850,825, entitled, Method for suppressing deployment of an inflatable restraint based on sensed occupant weight, assigned to Delphi Technologies, Inc. Employing a form of occupant detection to save the lives of infants, children and pets would be useful.

SUMMARY OF THE INVENTION

An occupant detection and temperature sensing safety system and method are provided by the present invention. The presence of an occupant endangered by being situated in a variable temperature setting is made known to either custodial persons or emergency services. Remedial actions can be immediately employed. Occupants include an infant, a child, a person, and an animal or pet. The safety system and method can be utilized within a variety of settings including an open environment without shelter to weather, and an enclosed area. In an embodiment, the system is utilized within a motor vehicle.

In an embodiment, the safety system incorporates backup functions including a low battery alert and a system test to ensure the system is functioning properly. In a further embodiment, an intruder alert function is provided for alerting that an area, such as an automobile cabin, was entered without authorization. In yet a further embodiment, a time delay is employed to allow an occupant to enter a vehicle that previously underwent a predetermined temperature.

Material costs, manufacturing costs and assembly costs are minimal, and embodiments of the invention can substantially utilize an existing vehicle infrastructure. Further, in an embodiment, the sensors of the present invention can be simply installed to an existing vehicle infrastructure and are reliable. Additionally, the sensors are inconspicuous and can be fully concealed.

Features of the invention are achieved in part, in an embodiment, by utilizing a sensor for detecting an occupant and a temperature sensor adjacent to the occupant sensor. When a security device receives a signal that the occupant sensor detects the presence of an occupant and the temperature sensor detects a predetermined temperature, both within a predetermined time period, then a security response is initiated. The security device receives the signal either wirelessly or by a physical connection from the sensors to the security device. A security response can include triggering an audible alarm, flashing a light, lowering a window, unlocking a door, notifying an owner of the security device, and transmitting an emergency signal to an emergency system including telephone 911 and an emergency response company.

In an embodiment, both the occupant sensor and the temperature sensor are affixed to a key fob chip set such that an antenna transmits a signal to the security device. Further, the key fob can be affixed to an infant seat, child seat, handicapped person seat, pet collar or animal. In an embodiment, the key fob is generic and adaptable to operate with an alternative and substitutional security device manufactured by numerous motor vehicle companies, and the occupant sensor and temperature sensor are situated within a personality chip added to the key fob.

In an embodiment, a time delay is utilized with the invention. As an example of an embodiment, when a motor vehicle is entered, the temperature sensor would detect a predetermined temperature and an occupant sensor would detect the presence of an occupant. The time delay allows a predetermined time for entering a motor vehicle, occupying the motor vehicle, disarming the security device and adjusting the motor vehicle cabin temperature.

In an embodiment, the safety system backup functions such as the low battery alert are incorporated into the key fob. In an embodiment, the system test is a discreetly positioned test button, similar to smoke detector test button, in which the system is manually triggered to provoke a security response. In an embodiment, the intruder alert function, which alerts that an area was entered without authorization, utilizes the occupant sensor and signals an intruder alert when a rightful occupant reenters a site.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 3 is a diagrammatic view of the detection system as in FIG. 1 or FIG. 2, employed within a motor vehicle for the safety of an infant, in accordance with an embodiment of the present invention;

FIG. 4 is a diagrammatic view of the detection system as in FIG. 1 or FIG. 2, employed within a motor vehicle for the safety of a pet, in accordance with an embodiment of the present invention.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A safety system and method is described herein for detecting and alerting of the presence of an occupant endangered by being situated in a variable temperature setting. Remedial actions are immediately employed and emergency services and custodial persons are alerted. Additionally, embodiments of the invention can substantially utilize an existing security infrastructure, and material costs, manufacturing costs and assembly costs are minimal.

It is to be appreciated that an occupant, as used herein, includes humans including children, infants, handicapped persons, as well as animals including pets, dogs, cats, horses, laboratory animals, zoo animals, etc. Further, as used herein, the system and method described herein can be employed within a variety of settings including an open environment without shelter to weather, and an enclosed area. Enclosed areas include a motor vehicle, a ship cabin, a room within a building, a garage, etc.

Figure 1:
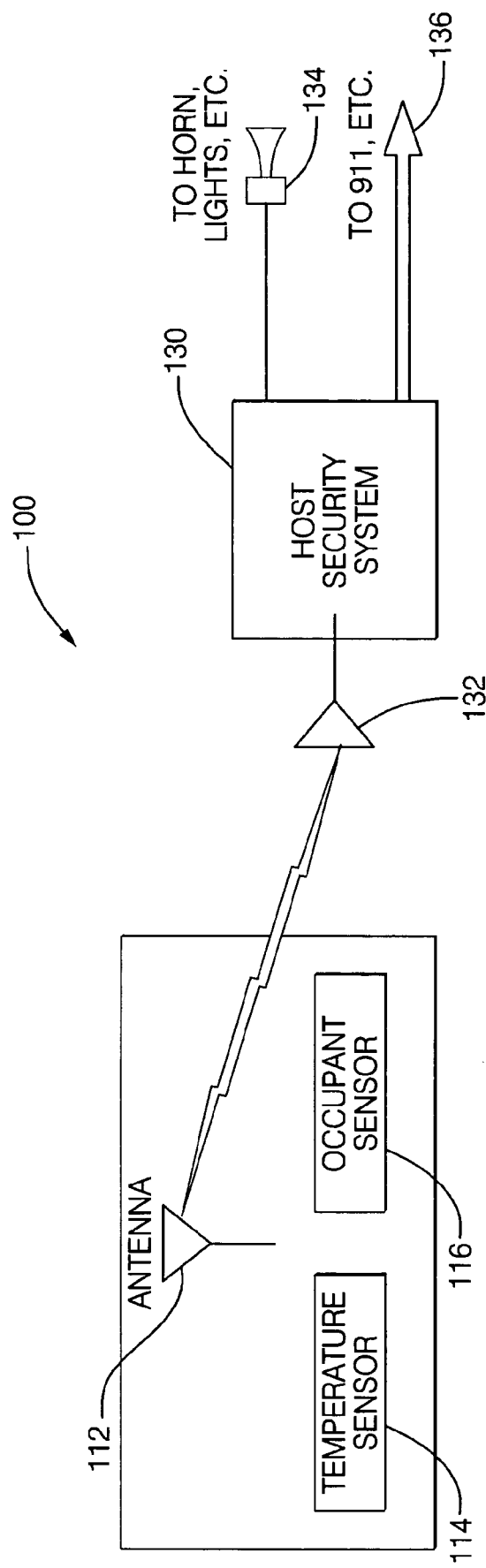
FIG. 1 is a diagrammatic sectional view illustrating a detection system for alerting of the presence of an occupant situated in a variable temperature location, in accordance with an embodiment of the present invention.

Referring to the drawings wherein identical reference numerals denote the same elements throughout the various views, FIG. 1 illustrates a detection system 100 for alerting of the presence of an occupant situated in a variable temperature location. Detection system 100 includes occupant sensor 116 and temperature sensor 114. In an embodiment, detection system 100 additionally includes security system 130. In another embodiment, detection system 100 operates in conjunction with an existing security system to initiate a security response.

A variety of sensors can be utilized for occupant sensor 116. For example, a pressure sensor can be utilized to detect the presence of an occupant seated in a seat. A motion detector can be utilized to detect motion from an occupant. A $CO_2$ sensor can be utilized to detect the breath from an occupant. Other sensors that may be employed for occupant sensor 116 include a passive infrared sensor and a charged particle heart rate sensor that utilizes centimeter wavelength microwaves to observe moving charges associated with the heart and respiration through detected microwave reflected energy. Further, occupant sensor 116 can be set to detect the presence, the absence, or both the presence and the absence of an occupant, depending on the necessary input to security system 130.

Temperature sensor 114 detects a predetermined temperature adjacent to occupant sensor 116. That is, temperature sensor 114 may be positioned directly next to occupant sensor 116 or in the vicinity of occupant sensor 114 such that an accurate temperature of the occupant's environment is detected. A variety of sensors may be utilized for temperature sensor 114 including thermocouples, thermistors, resistance-temperature detectors, and IC-temperature sensors. Further, in an embodiment, the present invention utilizes an existing temperature sensor provided by a motor vehicle infrastructure, rather than employing a separate temperature sensor.

Security system 130 can receive a signal from either (or both) occupant sensor 116 and temperature sensor 114. The signal received by security system 130 may be in the form of a one way communication. Alternatively, a two way communication may be employed between occupant sensor 116, temperature sensor 114 and security system 130. Further, occupant sensor 116 and temperature sensor 114 may be physically connected or wirelessly connected (via antennas 112 and 132) to security system 130.

In an embodiment, security system 130 receives a signal when occupant sensor 116 detects an occupant and temperature sensor 114 detects a predetermined temperature. As described herein, a predetermined temperature includes a single high/hot temperature (i.e., too hot to be comfortable and safe for an occupant), a single low/cold temperature (i.e., too cold to be comfortable and safe for an occupant), all temperatures hotter than the single high/hot temperature, and all temperatures colder than the single low/cold temperature. It is to be appreciated that a predetermined temperature as described herein may include one or more of the aforementioned temperatures. As an example, assuming a comfortable and safe temperature range for an occupant is between 65 and 70 degrees Fahrenheit, a predetermined temperature may include all temperatures at 64 degrees Fahrenheit and lower, and at 71 degrees Fahrenheit and higher.

In another embodiment, security system 130 receives a signal when occupant sensor 116 detects an occupant and a proximate temperature shifts outside (either above or below) a predetermined temperature range. In this case, the predetermined temperature range is defined as a comfortable and safe temperature range. The predetermined temperature range includes comfortable and safe temperatures to an occupant, and can also be set to include a temperature that is at the outer limit of a comfortable and safe temperature for an occupant. As described herein, a comfortable and safe temperature range includes temperatures for an occupant that at least avoids hyperthermia and hypothermia.

In an embodiment, security system 130 initiates a security response when, within a predetermined time period, occupant sensor 116 detects the presence of an occupant and temperature sensor 114 detects a predetermined temperature. It is to be appreciated that occupant sensor 116 may be set or programmed to detect an occupant before temperature sensor 114 detects a predetermined temperature (or vice-versa). The security system 130 can initiate a security response based on either order of detection. In an embodiment, the temperature sensor 114 commences to monitor temperature upon detection of occupant sensor 116 detecting an occupant, to save energy.

A security response can include a local response 134, which includes triggering an audible alarm, flashing a light, lowering a window, and unlocking a door. Additionally, the security response may include a remote response 136, which includes notifying a custodial person, and transmitting an emergency signal to an emergency service including telephone 911 and an emergency response company such as OnStar™. The remote response 136 can include pertinent information such as the nature of the problem, an involvement of a child or pet, and the motor vehicle description and location.

Figure 2:
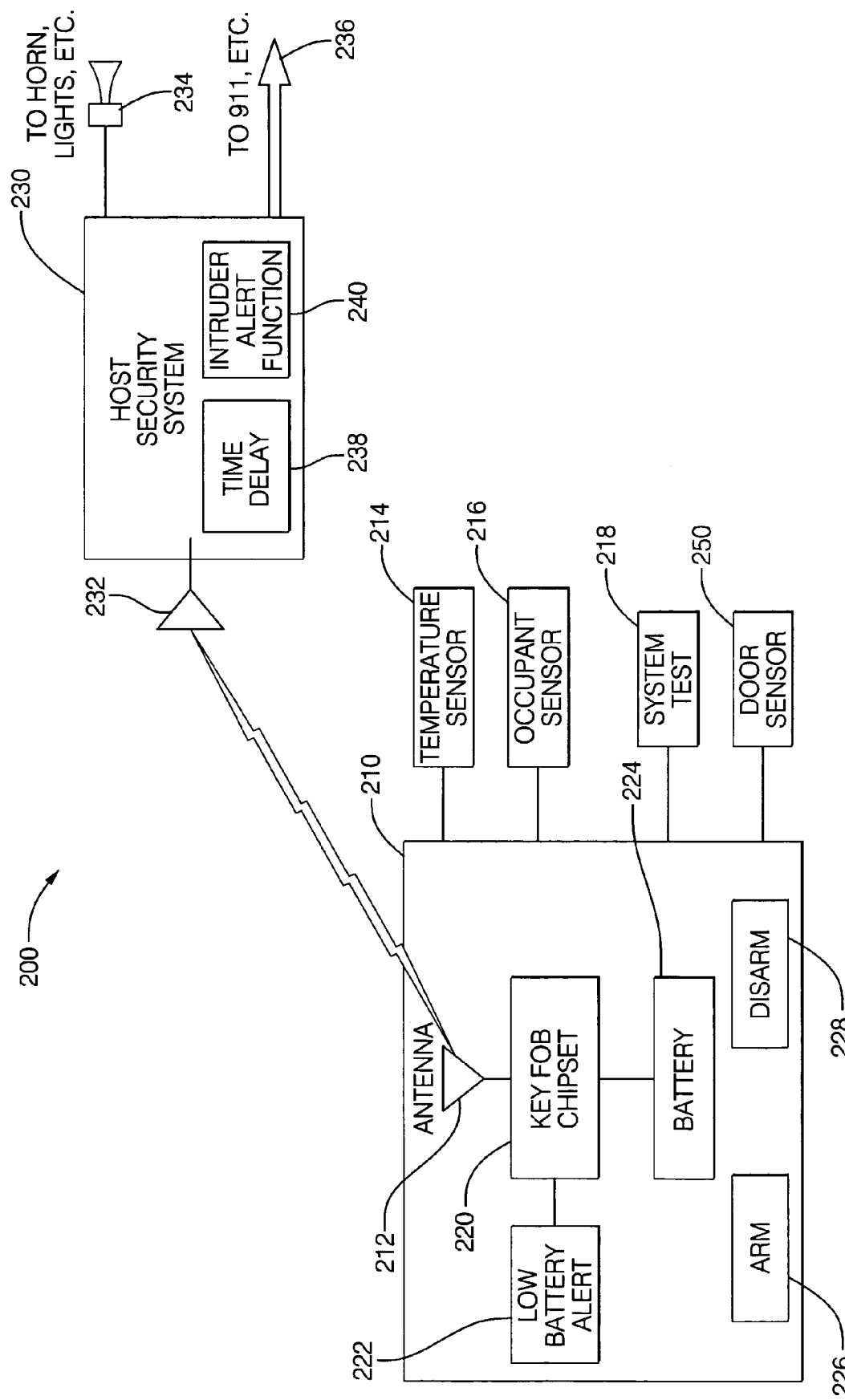
FIG. 2 is a diagrammatic sectional view illustrating a detection system, incorporated with a key fob chip set, for alerting of the presence of an occupant situated in a variable temperature location, in accordance with an embodiment of the present invention.

FIG. 2 shows a detection system 200, incorporating a key fob chip set, for alerting of the presence of an occupant situated in a variable temperature location. Similar to the system as in FIG. 1, when, within a predetermined time period, occupant sensor 216 detects the presence of an occupant and temperature sensor 214 detects a predetermined temperature, antennas 212 and 232 transmit a signal to host security system 230 and a security response may be executed. The security response includes local response 234 and remote response 236.

Temperature sensor 214 and occupant sensor 216 are incorporated with key fob chip set 220 within control module 210. In an embodiment, the key fob 220 is generic and adaptable to operate with a substitutional security device (i.e. security system 230) manufactured by alternative motor vehicle companies. Further, in an embodiment, occupant sensor 216 and temperature sensor 214 are situated within a personality chip and connected to key fob 220.

In an embodiment, the control module 210 includes backup functions including a low battery alert 222, and a system test 218 to ensure the system is functioning properly. The low battery alert 222 provides notification that either temperature sensor 214, occupant sensor 216, or key fob 220 will malfunction within a predetermined time due to the battery 224 being low in energy. The system test 218 is a discreetly positioned test button, similar to a smoke detector test button, in which the security system 230 is intentionally triggered to provoke a security response and verify that detection system 200 is properly functioning.

In an embodiment, security system 230 includes time delay 238 to avoid a false security response. As an example, this may occur when a motor vehicle is absent of any occupants, the interior temperature increases to a predetermined temperature, and an occupant enters the motor vehicle. Time delay 238 allows a predetermined time for entering a motor vehicle, occupying the motor vehicle, and disarming the detection system 200 (utilizing disarm function 228) when temperature sensor 214 detects a predetermined temperature and occupant sensor 216 detects the presence of an occupant when the motor vehicle is entered. The detection system 200 thereafter automatically rearms after a predetermined time of being manually disarmed. In an alternative embodiment, detection system 200 is manually rearmed by a person by utilizing arm function 226. The arm function 226 and disarm function 228, as a part of control module 210, are further described in FIG. 5 infra. Alternatively, the motor vehicle cabin temperature may be adjusted to a temperature that would avoid a security response. The motor vehicle cabin temperature may be adjusted by ways including lowering windows and utilizing air conditioning. In another embodiment, in the case where a disarm function is unavailable or not included with detection system 200, security system 230 monitors whether the motor vehicle is in motion, and if so a security response is not executed.

Security system 230 also includes intruder alert function 240, which alerts that an area was entered (such as an automobile cabin) without authorization, utilizing occupant sensor 216, and signals an intruder alert when a rightful occupant reenters a site.

Referring to FIG. 3, a diagrammatic view of the detection system as in FIG. 1 or FIG. 2 is employed within a motor vehicle for the safety of an infant. The control module may be affixed to one of an infant seat, child seat, handicapped person seat, pet collar, human and an animal. Here, control module 310, including an occupant sensor and a temperature sensor are shown affixed to an infant seat 330. The occupant sensor and temperature sensor are inconspicuous and can be fully concealed, for example within a compartment of infant seat 330.

The security system 316, which initiates a security response, may be affixed to the infant seat 330 with the control module 310 or may be situated apart from the control module 310. Here, security system 316 is situated as a part of the motor vehicle. In an embodiment, the security response initiated by security system 316, includes a local response, which includes triggering an audible alarm 324, flashing a light 326, lowering a window 322, and unlocking a door 320. Additionally, as previously mentioned, the security response may include a remote response, which includes notifying a custodial person, and transmitting an emergency signal to an emergency service including telephone 911 and an emergency response company such as OnStar™.

In an embodiment, the security system 416 further includes an additional temperature sensor that monitors the temperature outside a motor vehicle. When the temperature outside the vehicle is considerably different as compared to the cabin temperature (and a security response is initiated), then the vehicle windows are lowered to bring the cabin temperature to an acceptable and safe temperature for an occupant.

In an embodiment, the security system 416 monitors when the motor vehicle is recently stopped or shut off and a vehicle operator or passenger exits the vehicle and any door is closed, via door sensor 250 (FIG. 2). At this time, if the security system 416 receives a signal that an occupant is still present, then distinct vehicle audible chips are sounded (i.e., three or four rapid chirps rather than a single chirp typically sounded when a vehicle door is shut). If the distinct chirps are ignored (or the security system is not reset after the distinct chirps), then security system 416 monitors the internal cabin temperature of the vehicle. Should the security system 416 receive a signal that, within a predetermined time period, an occupant sensor detects the presence of an occupant and a temperature sensor detects a predetermined cabin temperature, then a security response is initiated as described infra.

FIG. 4 shows the detection system as in FIG. 1 or FIG. 2, employed within a motor vehicle for the safety of a pet. Here, control module 410, including an occupant sensor and a temperature sensor are shown affixed to pet collar 430. The occupant sensor can be activated by fastening or closure of the pet collar to avoid a false detection of occupant presence. The security system 416, which initiates a security response, may be affixed to the pet collar 430 with the control module 410 or may be situated apart from the control module 410. Here, security system 416 is situated as a part of the motor vehicle. In an embodiment, the security response initiated by security system 416, includes a local response, which includes triggering an audible alarm 424, flashing a light 426, lowering a window 422, and unlocking a door 420. Additionally, as previously mentioned, the security response may include a remote response, which includes notifying a custodial person, and transmitting an emergency signal to an emergency service including telephone 911 and an emergency response company such as OnStar™.

Figure 5:
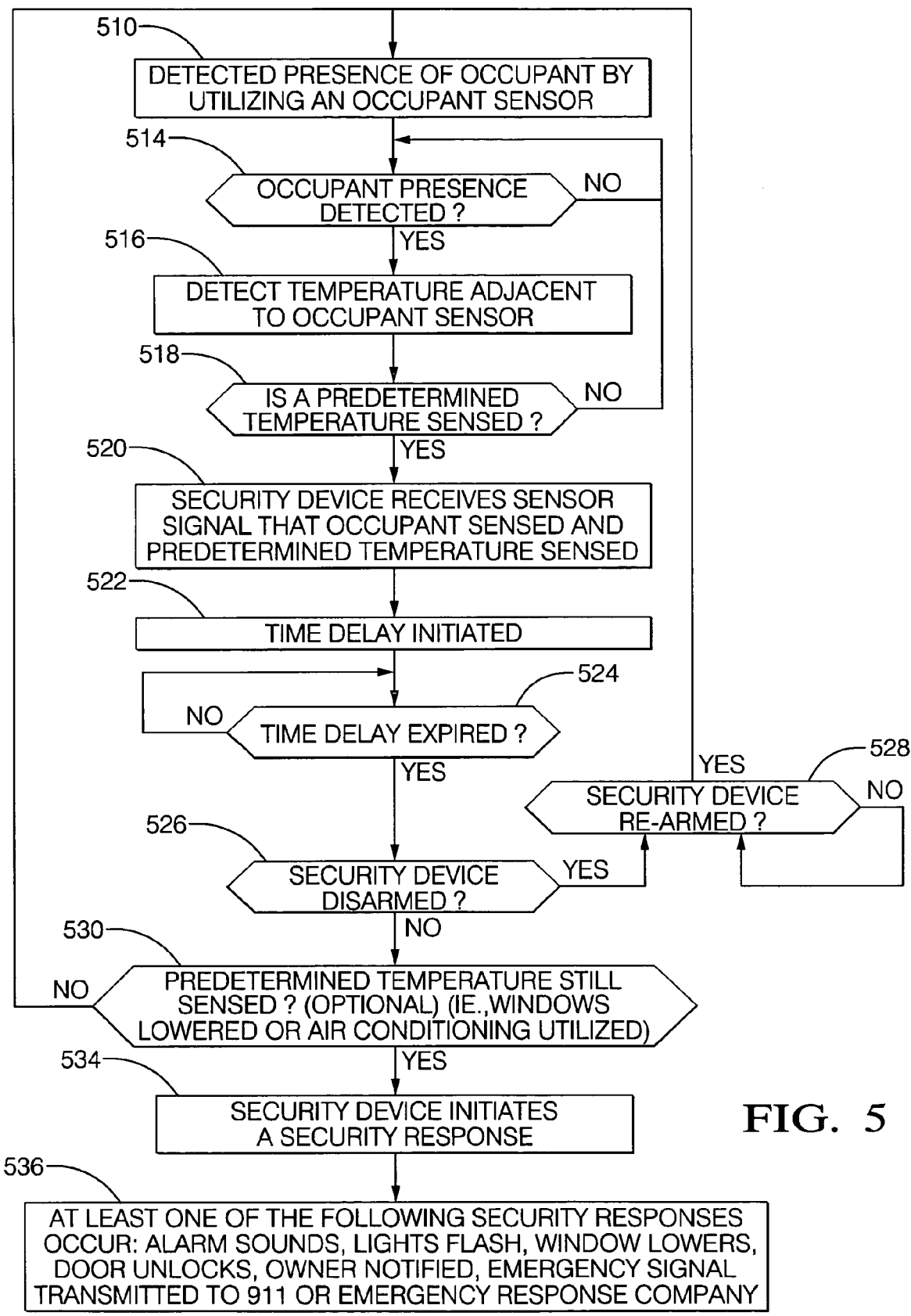
FIG. 5 is a logic diagram illustration of the detection of the presence of an occupant situated in a variable temperature location and the security response, in accordance with an embodiment of the present invention.

FIG. 5 illustrates a logic diagram showing the method of detection of the presence of an occupant situated in a variable temperature location and a security response. In logic step 510, the presence of an occupant is detected by utilizing an occupant sensor. Decision step 514 queries whether an occupant presence is detected. If no occupant presence is detected, then decision step 514 repeats. If an occupant presence is detected, then per logic step 516 the temperature adjacent to the occupant is detected. Next, decision step 518 queries whether a predetermined temperature is sensed. If a predetermined temperature is not sensed, then the query returns to whether an occupant presence is detected at decision step 514. If a predetermined temperature is sensed, then a security device receives a sensor signal that an occupant is sensed and a predetermined temperature is sensed, per logic step 520.

Next, per logic step 522, a time delay is initiated by the security system, and thereafter decision step 524 queries whether the time delay has expired. If the time delay has not expired, then decision step 524 repeats the query. If the time delay has expired, then decision step 526 queries whether the security system is disarmed manually by a person. If the security system is disarmed, then a security response is not initiated, and decision step 528 queries whether the security system is rearmed. If the security system is rearmed, then the presence of an occupant is detected per logic step 510. If the security system is not rearmed, then the decision step 528 repeats the query whether the security system is rearmed. In an embodiment, the security system automatically rearms after a predetermined time of being manually disarmed. In another embodiment, the security system rearms upon operator instruction.

Next, if the security system is not disarmed, per decision step 526, then optional decision step 530 queries whether a predetermined temperature is still sensed. The predetermined temperature may not be sensed any longer since a window may be lowered or air conditioning may be utilized. If a predetermined temperature is not still sensed, then the presence of an occupant is detected per logic step 510. If a predetermined temperature is still sensed, then per logic step 534 a security system initiates a security response. Finally, per logic step 536, at least one of the following security responses occur: an alarm sounds, lights flash, a window lowers, a door unlocks, an owner is notified, an emergency signal is transmitted to 911 or to an emergency response company. Finally, the security system is disarmed and then optionally rearmed, returning to logic step 510.

Other features and advantages of this invention will be apparent to a person of skill in the art who studies this disclosure. Thus, exemplary embodiments, modifications and variations may be made to the disclosed embodiments while remaining within the spirit and scope of the invention as defined by the appended claims.

We claim:

1. An occupant detection and temperature forewarn safety system, comprising:
    a portable control module affixable to an infant seat, a child seat, a handicapped person's seat, a pet collar, a human or an animal, the portable control module including a key fob adaptable to operate with a host security device, an occupant sensor, a temperature sensor, a manual disarming feature, and a radio transmitter for wirelessly communicating occupant status, temperature and arming status to a host security device; and
    a host security device including a radio receiver for wirelessly receiving occupant status, temperature, and arming status communications from the portable control module, and logic circuitry for generating a security response when an occupant is detected, a predetermined temperature is detected, and the manual disarming feature has not been activated.

2. The detection system as in claim 1, wherein the security response includes at least one of triggering an audible alarm, flashing a light, lowering a window, unlocking a door, notifying an owner of the security device, and transmitting an emergency signal to an emergency system including at least one of telephone 911, and an emergency response company.

3. The detection system as in claim 1, wherein the first sensor is one of a pressure sensor, a motion detector, a $CO_2$ sensor, and a microwave-based sensor, and wherein the second sensor is one of a thermocouple, thermistor, resistance-temperature detector, and IC-temperature sensor.

4. The detection system as in claim 1, further comprising
    a low battery alert for notification that at least one of the first sensor, the second sensor, and the key fob will malfunction within a predetermined time, and
    a system test for verifying that the first sensor, the second sensor, the key fob, and the security device are functioning.

5. The detection system as in claim 1, wherein the portable control module is employed within a motor vehicle, and the system further comprises a time delay for allowing a predetermined time for entering the motor vehicle, occupying the motor vehicle, and at least one of disarming the security device and adjusting the motor vehicle cabin temperature, wherein the second sensor detects the predetermined temperature and the first sensor detects the presence of the occupant when the motor vehicle is entered.

6. The detection system as in claim 1, wherein the portable control module is employed within a motor vehicle, and the system further comprises an intruder alert function for alerting that the motor vehicle was entered without authorization.

* * * * *